(12) United States Patent
Garudadri

(10) Patent No.: US 6,694,294 B1
(45) Date of Patent: Feb. 17, 2004

(54) SYSTEM AND METHOD OF MU-LAW OR A-LAW COMPRESSION OF BARK AMPLITUDES FOR SPEECH RECOGNITION

(75) Inventor: Harinath Garudadri, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 634 days.

(21) Appl. No.: 09/703,191

(22) Filed: Oct. 31, 2000

(51) Int. Cl.[7] ............................................... G10L 15/02
(52) U.S. Cl. ..................................... 704/234; 704/200.1
(58) Field of Search .............................. 704/234, 200.1, 704/211, 221, 226, 227

(56) References Cited

U.S. PATENT DOCUMENTS

| | | | |
|---|---|---|---|
| 5,450,522 A | | 9/1995 | Hermansky et al. |
| 5,475,792 A | | 12/1995 | Stanford et al. |
| 5,537,647 A | * | 7/1996 | Hermansky et al. ........ 704/211 |
| 5,615,296 A | | 3/1997 | Stanford et al. |
| 5,754,978 A | | 5/1998 | Perez-Mendez |
| 6,044,340 A | | 3/2000 | Van Hamme |
| 6,092,039 A | * | 7/2000 | Zingher ...................... 704/221 |

FOREIGN PATENT DOCUMENTS

DE       19710953 A1     7/1997

OTHER PUBLICATIONS

Openshaw, J. P., Z. P. Sun, and J.S. Mason, "A Comparison of Composites Features Under Degraded Speech in Speaker Recognition," IEEE Int. Conf. Acoust., Speech, and Sig. Proc., 1993 ICASSP–93, Apr. 27–30, 1993, vol. 2, pp. 371–374.*

U.S. application Ser. No. 09/657,760, entitled "System and Method For Automatic Voice Recognition Using Mapping," filed Sep. 8, 2000. Ning Bi, et al., Qualcomm Inc., San Diego, California (USA).

* cited by examiner

*Primary Examiner*—Richemond Dorvil
*Assistant Examiner*—Donald L. Storm
(74) *Attorney, Agent, or Firm*—Philip R. Wadsworth; Charles D. Brown; George C. Pappas

(57) ABSTRACT

A method and system that improves voice recognition by improving the voice recognizer of a voice recognition system. Mu-law compression of bark amplitudes is used to reduce the effect of additive noise and thus improve the accuracy of the voice recognition system. A-law compression of bark amplitudes is used to improve the accuracy of the voice recognizer. Both mu-law compression and mu-law expansion can be used in the voice recognizer to improve the accuracy of the voice recognizer. Both A-law compression and A-law expansion can be used in the voice recognizer to improve the accuracy of the voice recognizer.

54 Claims, 4 Drawing Sheets

VR Frontend for HMM With mu-law Compression

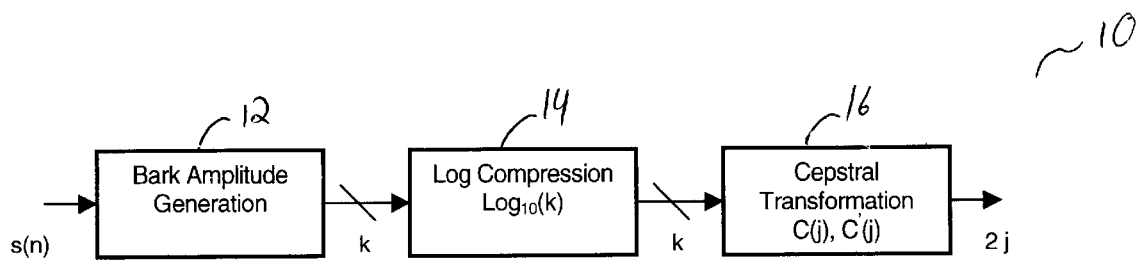
Figure 1. Typical VR Frontend
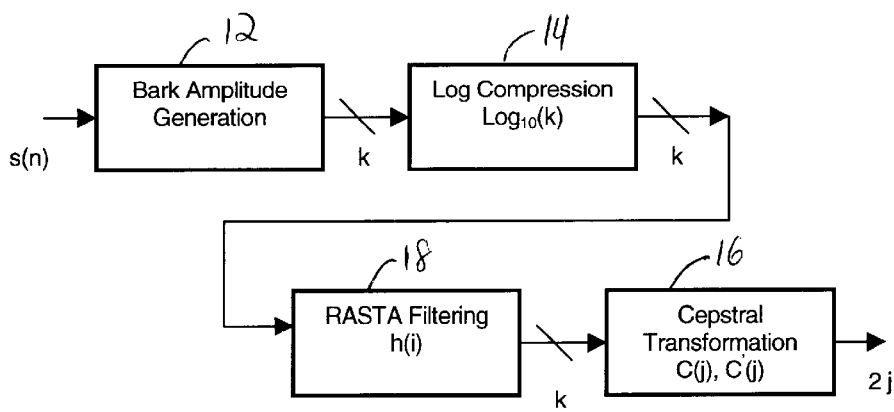
Figure 2. VR Frontend for HMM

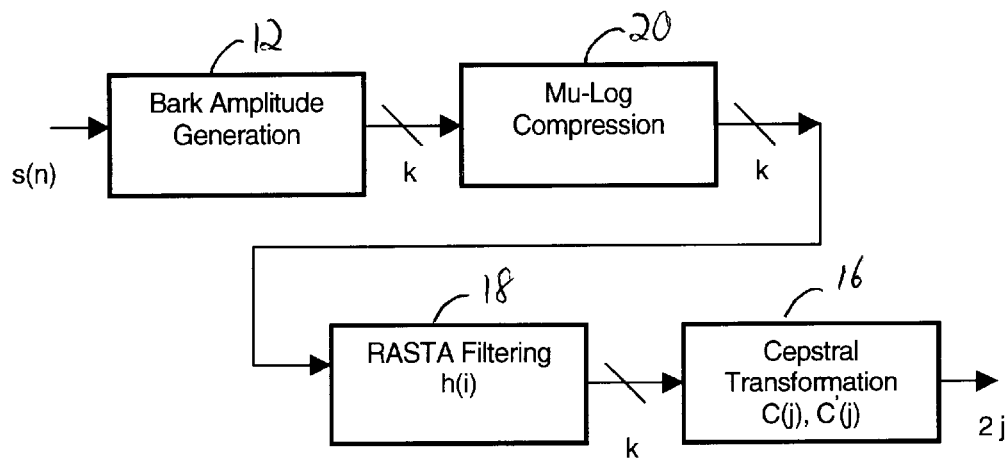
Figure 3. VR Frontend for HMM With mu-law Compression
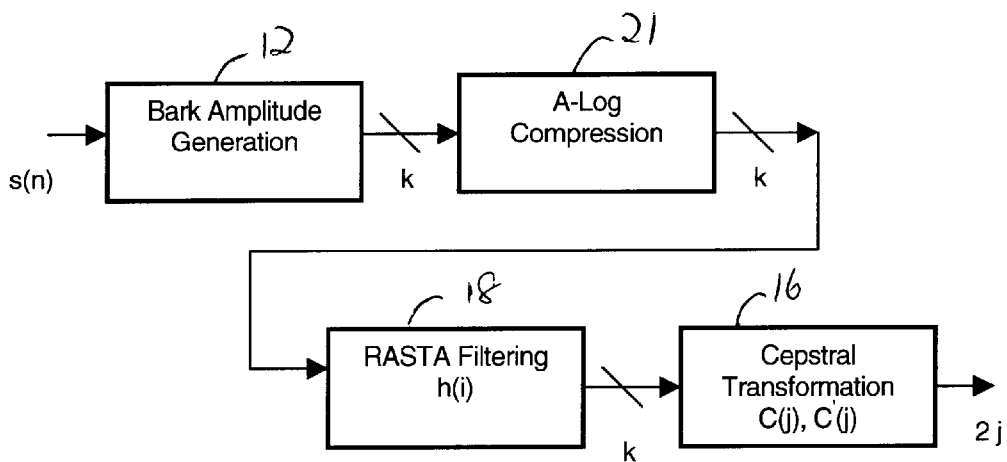
Figure 4. VR Frontend for HMM With A-law Compression

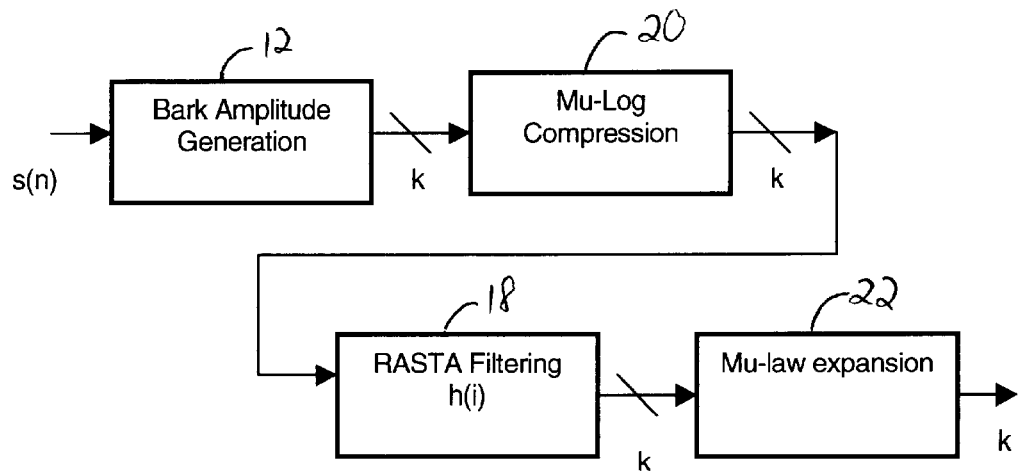
Figure 6. VR Frontend for DTW With RASTA and mu-law Expansion
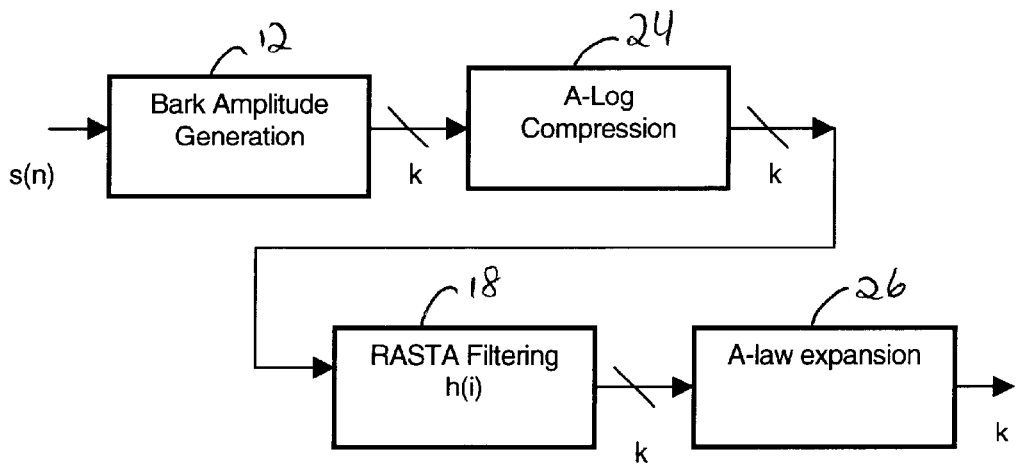
Figure 7. VR Frontend for DTW With RASTA and A-law Expansion

SYSTEM AND METHOD OF MU-LAW OR A-LAW COMPRESSION OF BARK AMPLITUDES FOR SPEECH RECOGNITION

BACKGROUND

I. Field

The present invention pertains generally to the field of communications and more specifically to a system and method for improving voice recognition in noisy environments and frequency mismatch conditions.

II. Background

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. The term "voice recognizer" is used herein to mean generally any spoken-user-interface-enabled device.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. In addition, a hands-free car-kit system would permit the driver to maintain both hands on the steering wheel during call initiation.

Speech recognition devices are classified as either speaker-dependent (SD) or speaker-independent (SI) devices. Speaker-dependent devices, which are more common, are trained to recognize commands from particular users. In contrast, speaker-independent devices are capable of accepting voice commands from any user. To increase the performance of a given VR system, whether speaker-dependent or speaker-independent, training is required to equip the system with valid parameters. In other words, the system needs to learn before it can function optimally.

An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls by speaking the trained keywords, which the VR device recognizes by comparing the spoken utterances with the previously trained utterances (stored as templates) and taking the best match. For example, if the name "John" were one of the trained names, the user could initiate a call to John by saying the phrase "Call John." The VR system would recognize the words "Call" and "John," and would dial the number that the user had previously entered as John's telephone number. Garbage templates are used to represent all words not in the vocabulary.

Combining multiple engines provides enhanced accuracy and uses a greater amount of information in the input speech signal. A system and method for combining VR engines is described in U.S. patent application Ser. No. 09/618,177 (hereinafter '177 application) entitled "Combined Engine System and Method for Voice Recognition", filed Jul. 18, 2000, and U.S. patent application Ser. No. 09/657,760 (hereinafter '760 application) entitled "System and Method for Automatic Voice Recognition Using Mapping," filed Sep. 8, 2000, which are assigned to the assignee of the present invention and fully incorporated herein by reference.

Although a VR system that combines VR engines is more accurate than a a VR system that uses a singular VR engine, each VR engine of the combined VR system may include inaccuracies because of a noisy environment. An input speech signal may not be recognized because of background noise. Background noise may result in no match between an input speech signal and a template from the VR system's vocabulary or may cause a mismatch between an input speech signal and a template from the VR system's vocabulary. When there is no match between the input speech signal and a template, the input speech signal is rejected. A mismatch results when a template that does not correspond to the input speech signal is chosen by the VR system. The mismatch condition is also known as substitution because an incorrect template is substituted for a correct template.

An embodiment that improves VR accuracy in the case of background noise is desired. An example of background noise that can cause a rejection or a mismatch is when a cell phone is used for voice dialing while driving and the input speech signal received at the microphone is corrupted by additive road noise. The additive road noise may degrade voice recognition and accuracy and cause a rejection or a mismatch.

Another example of noise that can cause a rejection or a mismatch is when the speech signal received at a microphone placed on the visor or a headset is subjected to convolutional distortion. Noise caused by convolutional distortion is known as convolutional noise and frequency mismatch. Convolutional distortion is dependent on many factors, such as distance between the mouth and microphone, frequency response of the microphone, acoustic properties of the interior of the automobile, etc. Such conditions may degrade voice recognition accuracy.

Traditionally, prior VR systems have included a RASTA filter to filter convolutional noise. However, background noise was not filtered by the RASTA filter. Thus, there is a need for a technique to filter both convolutional noise and background noise. Such a technique would improve the accuracy of a VR system.

SUMMARY

The described embodiments are directed to a system and method for improving the frontend of a voice recognition system. In one aspect, a system and method for voice recognition includes mu-law compression of bark amplitudes. In another aspect, a system and method for voice recognition includes A-law compression of bark amplitudes. Both mu-law and A-law compression of bark amplitudes reduce the effect of noisy environments, thereby improving the overall accuracy of a voice recognition system.

In another aspect, a system and method for voice recognition includes mu-law compression of bark amplitudes and mu-law expansion of RelAtive SpecTrAl (RASTA) filter outputs. In yet another aspect, a system and method for voice recognition includes A-law compression of bark amplitudes and A-law expansion of RASTA filter outputs. When mu-law compression and mu-law expansion, or A-law compression and A-law expansion, are used, a matching engine such as a Dynamic Time Warping (DTW) engine is better able to handle channel mismatch conditions.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 shows a typical VR frontend in a VR system;

FIG. 2 shows a frontend of a Hidden Markov Model (HMM) module of a VR system;

FIG. 3 shows a frontend having a mu-law companding scheme instead of log compression;

FIG. 4 shows a frontend having an A-law companding scheme instead of log compression;

FIG. 6 shows a frontend in accordance with an embodiment using mu-law compression and mu-law expansion; and FIG. 7 shows a frontend in accordance with an embodiment using A-law compression and A-law expansion.

DETAILED DESCRIPTION

Figure 5:
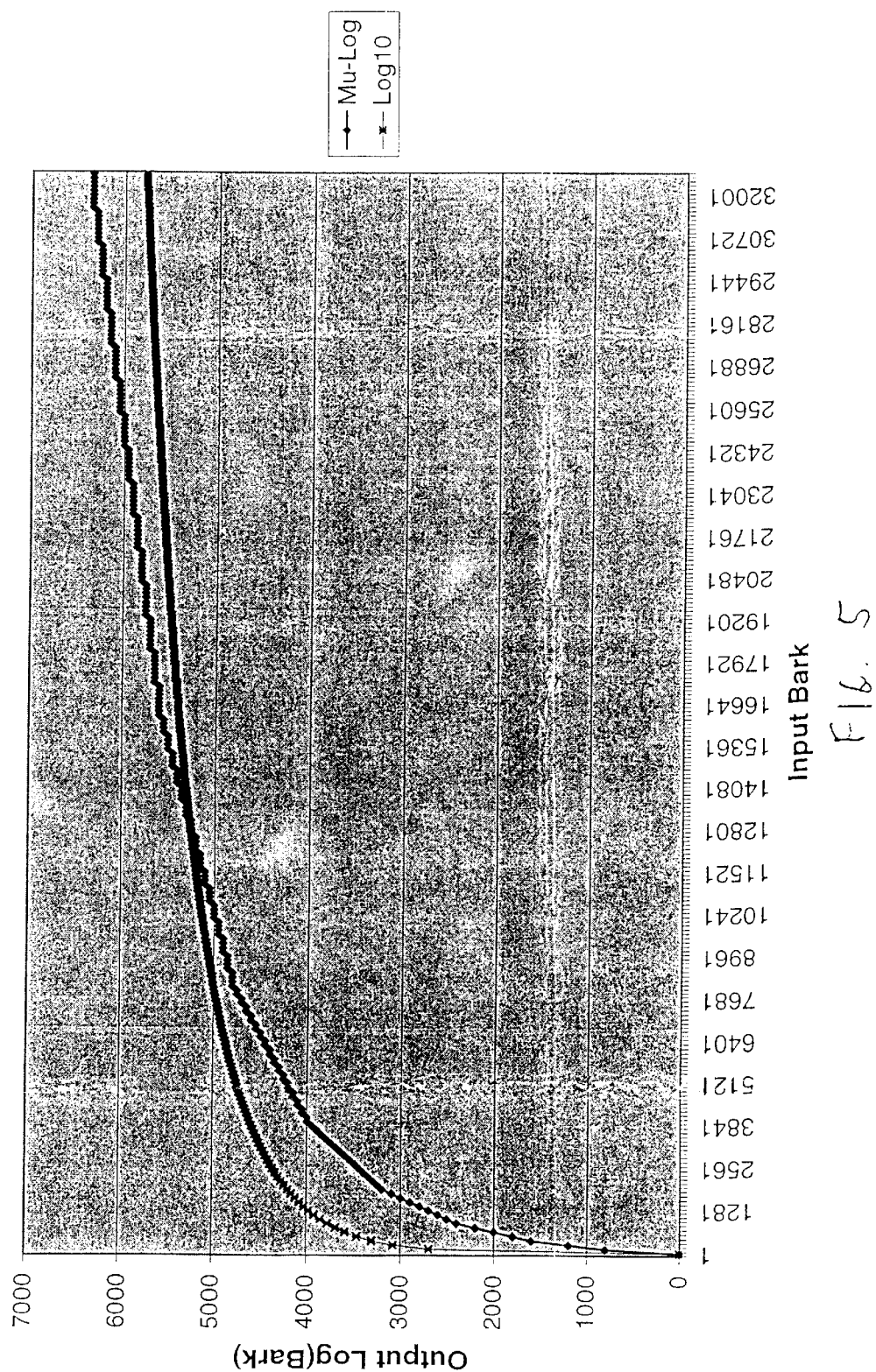
FIG. 5 shows a plot of a fixed point implementation of the $Log_{10}(\ )$ function and the mu-Log function, with C=50.

A VR system includes a frontend that performs frontend processing in order to characterize a speech segment. FIG. 1 shows a typical VR frontend 10 in a VR system. A Bark Amplitude Generation Module 12 converts a digitized PCM speech signal s(n) to k bark amplitudes once every T milliseconds. In one embodiment, T is 10 msec and k is 16 bark amplitudes. Thus, there are 16 bark amplitudes every 10 msec. It would be understood by those skilled in the art that k can be any positive integer. It would also be understood by those skilled in the art that any period of time may be used for T.

The Bark scale is a warped frequency scale of critical bands corresponding to human perception of hearing. Bark amplitude calculation is known in the art and described in Lawrence Rabiner & Biing-Hwang Juang, Fundamentals of Speech Recognition (1993), which is fully incorporated herein by reference.

The Bark Amplitude module 12 is coupled to a Log Compression module 14. The Log Compression module 14 transforms the bark amplitudes to a $log_{10}$ scale by taking the logarithm of each bark amplitude. The Log Compression module 14 is coupled to a Cepstral Transformation module 16. The Cepstral Transformation module 16 computes j static cepstral coefficients and j dynamic cepstral coefficients. Cepstral transformation is a cosine transformation that is well known in the art. See, e.g., Lawrence Rabiner & Biing-Hwang Juang, previously incorporated by reference. In one embodiment, j is 8. It would be understood by those skilled in the art that j can be any other positive integer. Thus, the frontend module 10 generates 2*j coefficients, once every T milliseconds. These features are processed by a backend module (not shown), such as an HMM system to perform voice recognition. An HMM module models a probabilistic framework for recognizing an input speech signal. In an HMM model, both time and spectral constraints are used to quantize an entire speech utterance.

FIG. 2 shows a frontend of an HMM module of a VR system. A Bark Amplitude module 12 is coupled to a Log Compression module 14. The Log Compression module 14 is coupled to a RASTA filtering module 18. The RASTA filtering module 18 is coupled to a Cepstral Transformation module 16. The log Bark amplitudes from each of the k channels are filtered using a bandpass filter h(i). In one embodiment, the RASTA filter is a bandpass filter h(i) that, has a center frequency around 4 Hz. Roughly, there are around four syllables per Gsecond in speech. Therefore, a bandpass filter having around a 4 Hz center frequency would retain speech-like signals and attenuate non-speech-like signals. Thus, the bandpass filter results in improved recognition accuracy in background noise and frequency mismatch conditions. It would be understood by those skilled in the art that the center frequency can be different from 4 Hz, depending on the task.

The filtered log Bark amplitudes are then processed by the Cepstral Transformation module to generate the 2*j coefficients, once every T milliseconds. An example of a bandpass filter that can be used in the VR frontend are the RASTA filters described in U.S. Pat. No. 5,450,522 entitled, "Auditory Model for Parametrization of Speech" filed Sep. 12, 1995, which is incorporated by reference herein. The frontend shown in FIG. 2 reduces the effects of channel mismatch conditions and improves VR recognition accuracy.

The frontend depicted in FIG. 2 is not very robust for background mismatch conditions. One of the reasons for this is that the Log compression process has a non-linear amplification effect on the bark channels. Log compression results in low amplitude regions being amplified more than high amplitude regions on the bark channels. Since the background noise is typically in the low amplitude regions on the bark channels, VR performance starts degrading as the signal-to-noise ratio (SNR) decreases. Thus, it is desirable to have a module that is linear-like in the low amplitude regions and log-like in the high amplitude regions on the bark channels.

This is efficiently achieved by using a log companding scheme, such as the G.711 log companding (compression and expansion) as described in the International Telecommunication Union (ITU-T) Recommendation G.711 (11/88)—Pulse code modulation (PCM) of voice frequencies and in the G711.C, G.711 ENCODING/DECODING FUNCTIONS. The ITU-T (for Telecommunication Standardization Sector of the International Telecommunications Union) is the primary international body for fostering cooperative standards for telecommunications equipment and systems.

There are two G.711 log companding schemes: a mu-law companding scheme and an A-law companding scheme. Both the mu-law companding scheme and the A-law companding scheme are Pulse Code Modulation (PCM) methods. That is, an analog signal is sampled and the amplitude of each sampled signal is quantized, i.e., assigned a digital value. Both the mu-law and A-law companding schemes quantize the sampled signal by a linear approximation of the logarithmic curve of the sampled signal.

Both the mu-law and A-law companding schemes operate on a logarithmic curve. Therefore the logarithmic curve is divided into segments, wherein each successive segment is twice the length of the previous segment. The A-law and u-law companding schemes have different segment lengths because the mu-law and A-law companding schemes calculate the linear approximation differently.

The G.711 standard includes a mu-law lookup table that approximates the mu-law linear approximation as shown in Table 1 below. Under the mu-law companding scheme, an analog signal is approximated with a total of 8,159 intervals.

TABLE 1

| Value Range | Number of Intervals | Interval Size |
| --- | --- | --- |
| 0 | 1 | 1 |
| 1–16 | 15 | 2 |
| 17–32 | 16 | 4 |
| 33–48 | 16 | 8 |
| 49–64 | 16 | 16 |
| 65–80 | 16 | 32 |
| 81–96 | 16 | 64 |
| 97–112 | 16 | 128 |
| 113–127 | 16 | 256 |

The G.711 standard includes a A-law lookup table that approximates the A-law linear approximation as shown in Table 2 below. Under the A-law companding scheme, an analog signal is approximated with a total of 4,096 intervals.

TABLE 2

| Value Range | Number of Intervals | Interval Size |
| --- | --- | --- |
| 0–32 | 32 | 2 |
| 33–48 | 16 | 4 |
| 49–64 | 16 | 8 |
| 65–80 | 16 | 16 |
| 81–96 | 16 | 32 |
| 97–112 | 16 | 64 |
| 113–127 | 16 | 128 |

The G.711 standard specifies a mu-law companding scheme to represent speech quantized at 14 bits per sample in 8 bits per sample. The G.711 standard also specifies an A-law companding scheme to represent speech quantized at 13 bits per sample in 8 bits per sample. Exemplary 8-bit data is speech telephony. The G.711 specification is optimized for signals such as speech, with a Laplacian probability density function (pdf).

It would be understood by those skilled in the art that other companding schemes may be used. In addition, it would be understood by those skilled in the art that other quantization rates may be used.

In one embodiment, a mu-law companding scheme 20 is used in the frontend instead of the log compression scheme, as shown in FIG. 3. FIG. 3 shows the frontend of an embodiment using a mu-law companding scheme, i.e., a mu-Log compression module 20. The Bark Amplitude Generation module 12 is coupled to the mu-Log Compression module 20. The mu-Log Compression module 20 is coupled to a RASTA filtering module 18. The RASTA filtering module 18 is coupled to a Cepstral Transformation module 16.

A digitized speech signal s(n), which includes convolutional distortion enters the Bark Amplitude Generation module 12. After the Bark Amplitude Generation Module 12 converts the digitized PCM speech signal s(n) to k bark amplitudes, the convolutional distortion becomes multiplicative distortion. The mu-Log Compression module 20 performs mu-log compression on the k bark amplitudes. The mu-log compression makes the multiplicative distortion additive. The Rasta filtering module 18 filters any stationary components, thereby removing the convolution distortion since convolutional distortion components are stationary. The Cepstral Transformation module 16 computes j static cepstral coefficients and j dynamic cepstral coefficients from the RASTA-filtered output.

In another embodiment, an A-law companding scheme 21 is used in the frontend instead of a log compression scheme, as shown in FIG. 4. FIG. 4 shows the frontend of an embodiment using an A-law companding scheme, i.e., an A-Log compression module 21. The Bark Amplitude module 12 is coupled to the A-Log Compression module 21. The A-Log Compression module 21 is coupled to a RASTA filtering module 18. The RASTA filtering module 18 is coupled to a Cepstral Transformation module 16.

An embodiment employing G.711 mu-law companding has two functions called mu-law_compress for compressing bark amplitudes and mu-law_expand for expanding filter outputs to produce bark amplitudes. In one embodiment, the mu-Log compression module 20 implements the compression using the following formula:

Log_Bark (i)={255−mulaw_compress[Bark(i)]}*C, where C is a constant.

The value of C can be adjusted to take advantage of the available resolution in a fixed-point VR implementation.

FIG. 5 shows a plot of a fixed-point implementation of the $Log_{10}()$ function and the mu-Log function, with C=50. FIG. 5 shows that for low amplitude signals, the mu-Log function is more linear than the $Log_{10}()$ function.

In some recognition schemes, the backend operates on the bark channel amplitudes, rather than static and dynamic cepstral parameters. In the combined engine scheme described in the '177 application and the '760 application, the DTW engine operates on bark channel amplitudes after time-clustering and amplitude quantization. The DTW engine is based on template matching. Stored templates are matched to features of the input speech signal.

The DTW engine described in the '177 application and the '760 application is more robust to background mismatch conditions than to channel mismatch conditions. FIG. 6 depicts a frontend of an embodiment that improves the DTW engine for channel mismatch conditions. FIG. 6 shows a frontend in accordance with an embodiment using mu-law compression and mu-law expansion, i.e., the mu-Log compression module 20 and the mu-law expansion module 22. The Bark Amplitude module 12 is coupled to a mu-Log Compression module 20. The mu-Log Compression module 20 is coupled to a RASTA filtering module 18. The RASTA filtering module 18 is coupled to the mu-law expansion module 22.

In one embodiment, the Mu-Log expansion is implemented using the following formula:

Bark'(i)=mulaw_expand{255−[R(i)*D]}, where D is a constant.

R(i) is the output of the RASTA module and D=0.02 (or 1/C). In one embodiment, the product [R(i)*D] is in the 0-to-127 range. The Mu-Log expansion puts the Bark'(i) in the bark amplitude range and the adverse effects of channel mismatch conditions are removed by the RASTA processing.

FIG. 7 depicts an embodiment for improving the DTW engine for channel mismatch conditions. FIG. 7 shows a frontend in accordance with an embodiment using A-law compression and A-law expansion, i.e., an A-Log compression module 24 and an A-law expansion module 26. A Bark Amplitude module 12 is coupled to the A-Log Compression module 24. The A-Log Compression module 24 is coupled to a RASTA filtering module 18. The RASTA filtering module 18 is coupled to the A-law expansion module 26. The A-log Compression module 24 performs A-log compression of the RASTA-filtered bark amplitudes.

Thus, a novel and improved method and apparatus for voice recognition has been described. Those of skill in the art would understand that the various illustrative logical blocks, modules, and mapping described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, and mapping described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The Bark Amplitude Generation 12, RASTA filtering module 18, Mu-Log Compression module 20, A-Log Compression module 21, and the Cepstral Transformation module 16 may advantageously be executed in a microprocessor, but in the alternative, the Bark Amplitude Generation, RASTA filtering module, Mu-Log Compression module, A-Log Compression module, and the Cepstral Transformation module may be executed in any conventional processor, controller, microcontroller, or state machine. The templates could reside in RAM memory, flash memory, ROM memory, EPROM memory, EEPROM memory, registers, hard disk, a removable disk, a CD-ROM, or any other form of storage medium known in the art. The memory (not shown) may be integral to any aforementioned processor (not shown). A processor (not shown) and memory (not shown) may reside in an ASIC (not shown). The ASIC may reside in a telephone.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A voice recognizer of a distributed voice recognition system, comprising:
   a bark amplitude generation module configured to convert a digitized speech signal to bark amplitudes;
   a mu-log compression module coupled to the bark amplitude generation module, the mu-log compression module configured to perform mu-log compression of the bark amplitudes;
   a RASTA filtering module coupled to the mu-log compression module, the RASTA filtering module configured to RASTA filter the mu-log bark amplitudes; and
   a cepstral transformation module coupled to the RASTA filtering module, the cepstral transformation module configured to generate j static cepstral coefficients and j dynamic cepstral coefficients.

2. The voice recognizer of claim 1 further comprising a backend configured to process the j static cepstral coefficients and j dynamic cepstral coefficients and produces a recognition hypothesis.

3. The voice recognizer of claim 1, wherein the mu-log compression is G.711 mu-log compression.

4. The voice recognizer of claim 1, wherein the bark amplitude generation module is configured to convert a digitized speech signal to k bark amplitudes once very T milliseconds.

5. The voice recognizer of claim 4, wherein the cepstral transformation module is configured to generate j static cepstral coefficients and j dynamic cepstral coefficients every T milliseconds.

6. The voice recognizer of claim 5, wherein T equals 10.

7. The voice recognizer of claim 4, wherein k equals 16.

8. A voice recognizer of a distributed voice recognition system, comprising:
   a bark amplitude generation module configured to convert a digitized speech signal to bark amplitudes;
   an A-log compression module coupled to the bark amplitude generation module, the A-log compression module configured to perform A-log compression of the bark amplitudes;
   a RASTA filtering module coupled to the A-log compression module, the RASTA filtering module configured to RASTA filter the A-log bark amplitudes; and
   a cepstral transformation module coupled to the RASTA filtering module, the cepstral transformation module configured to generate j static cepstral coefficients and j dynamic cepstral coefficients.

9. The voice recognizer of claim 8 further comprising a backend configured to process the j static cepstral coefficients and j dynamic cepstral coefficients and produces a recognition hypothesis.

10. The voice recognizer of claim 8, wherein the A-log compression is G. 711 A-log compression.

11. The voice recognizer of claim 8, wherein the bark amplitude generation module is configured to convert a digitized speech signal to k bark amplitudes once very T milliseconds.

12. The voice recognizer of claim 11, wherein the cepstral transformation module is configured to generate j static cepstral coefficients and j dynamic cepstral coefficients every T milliseconds.

13. The voice recognizer of claim 12, wherein T equals 10.

14. The voice recognizer of claim 11, wherein k equals 16.

15. A voice recognizer of a distributed voice recognition system, comprising:
   a bark amplitude generation module configured to converts a digitized speech signal to bark amplitudes;
   a mu-log compression module coupled to the bark amplitude generation module, the mu-log compression module configured to perform mu-log compression of the bark amplitudes;
   a RASTA filtering module coupled to the mu-log compression module, the RASTA filtering module configured to RASTA filters the mu-log bark amplitudes; and
   a mu-log expansion module coupled to the RASTA filtering module, the mu-log expansion module configured to perform mu-log expansion of the filtered mu-log bark amplitudes.

16. The voice recognizer of claim 15 further comprising a backend configured to process the expanded bark amplitudes and produces a recognition hypothesis.

17. The voice recognizer of claim 15, wherein the mu-log compression and expansion is G.711 mu-log compression and expansion.

18. The voice recognizer of claim 15, wherein the bark amplitude generation module is configured to convert a digitized speech signal to k bark amplitudes once very T milliseconds.

19. The voice recognizer of claim 18, wherein the mu-log expansion module is configured to expand the filtered mu-log bark amplitudes into k expanded bark amplitudes.

20. The voice recognizer of claim 19, wherein T equals 10.

21. The voice recognizer of claim 18, wherein k equals 16.

22. A voice recognizer of a distributed voice recognition system, comprising:
a bark amplitude generation module configured to convert a digitized speech signal to bark amplitudes;
an A-log compression module coupled to the bark amplitude generation module, the A-log compression module configured to perform A-log compression of the bark amplitudes;
a RASTA filtering module coupled to the A-log compression module, the RASTA filtering module configured to RASTA filter the A-log bark amplitudes; and
an A-log expansion module coupled to the RASTA filtering module, the A-log expansion module configured to perform A-log expansion of the filtered A-log bark amplitudes.

23. The voice recognizer of claim 22 further comprising a backend configured to process the expanded bark amplitudes and produces a recognition hypothesis.

24. The voice recognizer of claim 22, wherein the A-log compression and expansion is G.711 A-log compression and expansion.

25. The voice recognizer of claim 22, wherein the bark amplitude generation module is configured to convert a digitized speech signal to k bark amplitudes once very T milliseconds.

26. The voice recognizer of claim 25, wherein the A-log expansion module is configured to expand the filtered A-log bark amplitudes into k expanded bark amplitudes.

27. The voice recognizer of claim 25, wherein k equals 16.

28. The voice recognizer of claim 27, wherein T equals 10.

29. A method of voice recognizer processing for voice recognition, comprising:
converting a digitized speech signal to bark amplitudes;
mu-log compressing the bark amplitudes;
RASTA-filtering the mu-log bark amplitudes; and
transforming cepstrally the mu-log bark amplitudes to j static cepstral coefficients and j dynamic cepstral coefficients.

30. The method of claim 29, wherein the mu-log compressing is G.711 mu-log compressing.

31. The method of claim 29, wherein the coverting includes converting the digitized speech signal to k bark amplitudes once very T milliseconds.

32. The method of claim 31, wherein the transforming includes transforming cepstrally the mu-log bark amplitudes to j static cepstral coefficients and j dynamic cepstral coefficients every T milliseconds.

33. The method of claim 32, wherein T equals 10.

34. The method of claim 31, wherein k equals 16.

35. A method of voice recognition, comprising: converting a digitized speech signal to bark amplitudes;
mu-log compressing the bark amplitudes;
RASTA-filtering the mu-log bark amplitudes;
transforming cepstrally the mu-log bark amplitudes to j static cepstral coefficients and j dynamic cepstral coefficients; and
producing a recognition hypothesis based on the j static cepstral coefficients and j dynamic cepstral coefficients.

36. A method of voice recognition, comprising:
converting a digitized speech signal to bark amplitudes;
A-log compressing the bark amplitudes;
RASTA-filtering the A-log bark amplitudes; and
transforming cepstrally the A-log bark amplitudes to j static cepstral coefficients and j dynamic cepstral coefficients.

37. The method of claim 36, wherein the A-log compressing is G.711 A-log compressing.

38. The method of claim 36, wherein the coverting includes converting the digitized speech signal to k bark amplitudes once very T milliseconds.

39. The method of claim 38, wherein the transforming includes transforming cepstrally the A-log bark amplitudes to j static cepstral coefficients and j dynamic cepstral coefficients every T milliseconds.

40. The method of claim 38, wherein k equals 16.

41. The method of claim 39, wherein T equals 10.

42. A method of voice recognition, comprising:
converting a digitized speech signal to bark amplitudes;
A-log compressing the bark amplitudes;
RASTA-filtering the A-log bark amplitudes;
transforming cepstrally the A-log bark amplitudes to j static cepstral coefficients and j dynamic cepstral coefficients; and
producing a recognition hypothesis based on the j static cepstral coefficients and j dynamic cepstral coefficients.

43. A method of voice recognition, comprising:
converting a digitized speech signal to bark amplitudes;
mu-log compressing the bark amplitudes;
RASTA-filtering the mu-log bark amplitudes; and
mu-log expanding the filtered mu-log bark amplitudes.

44. The method of claim 43, wherein the mu-log compressing is G.711 mu-log compressing.

45. The method of claim 43, wherein the coverting includes converting the digitized speech signal to k bark amplitudes once very T milliseconds.

46. The method of claim 45, wherein k equals 16.

47. The method of claim 46, wherein T equals 10.

48. A method of voice recognition, comprising:
converting a digitized speech signal to bark amplitudes;
mu-log compressing the bark amplitudes;
RASTA-filtering the mu-log bark amplitudes; and
mu-log expanding the filtered mu-log bark amplitudes; and
producing a recognition hypothesis based on the expanded mu-log bark amplitudes.

49. A method of voice recognition, comprising:
converting a digitized speech signal to bark amplitudes;
A-log compressing the bark amplitudes;

RASTA-filtering the A-log bark amplitudes; and

A-log expanding the filtered A-log bark amplitudes.

50. The method of claim 49, wherein the A-log compressing is G.711 A-log compressing.

51. The method of claim 49, wherein the coverting includes converting the digitized speech signal to k bark amplitudes once very T milliseconds.

52. The method of claim 51, wherein k equals 16.

53. The method of claim 52, wherein T equals 10.

54. A method of voice recognition, comprising:

converting a digitized speech signal to bark amplitudes;

A-log compressing the bark amplitudes;

RASTA-filtering the A-log bark amplitudes; and

A-log expanding the filtered A-log bark amplitudes; and producing a recognition hypothesis based on the expanded A-log bark amplitudes.

* * * * *